United States Patent [19]

Waggener, Sr. et al.

[11] Patent Number: 4,829,540
[45] Date of Patent: May 9, 1989

[54] SECURE COMMUNICATION SYSTEM FOR MULTIPLE REMOTE UNITS

[75] Inventors: William N. Waggener, Sr.; John P. Keal, both of Sarasota, Fla.

[73] Assignee: Fairchild Weston Systems, Inc., Sarasota, Fla.

[21] Appl. No.: 115,601

[22] Filed: Oct. 29, 1987

Related U.S. Application Data

[63] Continuation of Ser. No. 867,137, May 27, 1986, abandoned.

[51] Int. Cl.$^4$ ............................................. H04K 1/00
[52] U.S. Cl. .................................... 375/1; 380/34
[58] Field of Search ................... 375/1, 56; 380/34

[56] References Cited

U.S. PATENT DOCUMENTS

| | | | |
|---|---|---|---|
| 4,442,527 | 4/1984 | Munday | 375/1.0 |
| 4,455,651 | 6/1984 | Baran | 375/1.0 |
| 4,580,277 | 4/1986 | Angello et al. | 375/56 |

OTHER PUBLICATIONS

"Spread Spectrum Systems", by Robert C. Dixon, 1984.

*Primary Examiner*—Salvatore Cangialosi
*Attorney, Agent, or Firm*—Sanford J. Asman

[57] ABSTRACT

A frequency-hopping datalink and providing communication between a base station, relay unit and multiple remote units utilizes time-division multiplexing and transmits information signals containing information relevant to the next frequencies of transmission. Signals from the base station are transmitted on a first frequency to a relay unit which retransmits the signals on a second frequency to a group of remote units. The information signal from the base station contains information concerning the frequencies of the next transmission and the time slot allotted for the remote units to respond. The remote units respond back at the first frequency which is received by the relay unit and rebroadcast to the base station at the second frequency. The first and second frequencies are changed after each message in accordance with a pseudo-random sequence generated either at the base station (and transmitted in encrypted form) or by means of a pseudo-random sequence generated at each remote unit and the relay unit, whose initial state is reset by an internal or externally derived time reference and whose pattern is determined by an internal key.

18 Claims, 3 Drawing Sheets

MESSAGE FORMAT

FREQUENCY SEQUENCE GENERATOR

SECURE COMMUNICATION SYSTEM FOR MULTIPLE REMOTE UNITS

This application is a continuation of application Ser. No. 867,137, filed May 27, 1986, now abandoned.

CROSS-REFERENCE TO RELATED APPLICATION

This application is related to copending application Ser. No. 625,885 filed June 29, 1984, entitled SECURE COMMUNICATION SYSTEM, and assigned to the assignee of the present application.

TECHNICAL FIELD

The present invention relates to the field of secure data communication systems and, more particularly, to such a system for use with multiple remote units.

BACKGROUND ART

As disclosed in copending application Ser. No. 625,885 various types of communications techniques are employed in order to enhance the security of information being transmitted between a base or ground station and a remote station or vehicle, such as a pilotless reconnaissance aircraft, and to make such communications more resistant to intentional jamming or noise.

In the aforementioned copending application there is described a method and apparatus for preventing intentional jamming of a transmitter and receiver in a secure communications system of the frequency-hopping type wherein an information signal is generated at the transmitter, the information signal including at least a portion representative of the frequency of transmission of the next information signal. The information signal is then transmitted and received at a remote receiver at a frequency determined by the frequency representative portion of an immediately preceding transmitted information signal.

While the system described in this copending application is adequate where there is to be direct communication between a transmitter and a receiver, a need may arise for a base station to communicate with multiple remote units through a relay unit.

DISCLOSURE OF THE INVENTION

The present invention concerns a method and apparatus for communicating between a base station and remote unit through a relay unit in a frequency-hopping communications system. More particularly, the method of the present invention is for use in a communication system of the type having at least one base station including a transmitter and a receiver, at least one relay unit including a transmitter and receiver, and at least one remote unit including a transmitter and receiver, and comprises the steps of generating and transmitting at the base station an information signal at a first predetermined frequency, receiving the information signal at the relay unit and transmitting the information signal at a second predetermined frequency, and receiving the information signal at the remote unit at this second predetermined frequency. In accordance with the invention, information for setting the first and second predetermined frequencies is transmitted as part of the information signal and the frequencies are periodically changed. Preferably the frequencies are randomly changed in order to ensure communications security.

The information for setting the first and second predetermined frequencies may, for example, be a portion of the information signal representative of the next frequencies to be used for transmission and reception. Alternatively, the information for setting the first and second predetermined frequencies is a signal for changing the state of a pseudo-random frequency selector or a frequency mapping table forming part of the transmitters and receivers of the relay and remote units.

In order to further enhance the transmission security, the information for setting the first and second predetermined frequencies can be encrypted.

The present invention may further be used where a remote unit generates and transmits a second information signal. This second information signal is transmitted at the first predetermined frequency and received at the relay unit. The relay unit then retransmits the second information signal at the second predetermined frequency which is then received by the base station.

In order to prevent interference between the transmission of the remote units the information signal transmitted by the base station includes a portion indicative of separate and unique time delays for transmission of information signals generated by each of the remote units.

With the foregoing system, multiple remote units may communicate with a base station via a relay unit using frequency-hoppingin order to prevent jamming of or interference with the signals between the base station and the remote units. Since the relay unit transmits at a frequency different than that at which the base station and remote units transmit, an eavesdropper or potential jammer would only be able to detect one of the two frequencies in use at a particular time. Thus transmission of a jamming signal on the transmission frequency of the relay unit would not affect the transmission or reception of information signals from the base station to the relay unit or from the remote units to the relay unit. Means may be provided at any of the base station, relay unit or remote units for detecting the onset and frequency of a jamming or other interfering signal so that these units may be arranged to switch to a predetermined set of one or more fall-back transmission frequencies or to avoid the frequencies of the detected interfering signal, such as set forth in the aforementioned copending application Ser. No. 625,885.

The foregoing arrangement thus enables communication to take place between a base station, relay unit and remote units with a high probability of success in completing the transmission even in the face of deliberate attempts to interfere with such communication.

Apparatus for performing the above method is also encompassed by the present invention.

BRIEF DESCRIPTION OF DRAWINGS

These and other features and advantages of the present invention will be clear from the following detailed description of the preferred embodiments, when taken in conjunction with the drawing figures wherein.

BEST MODES FOR CARRYING OUT THE INVENTION

The present invention is based directly upon the principles and techniques set forth in copending application Ser. No. 625,885, filed June 29, 1984, the disclosure of which is hereby incorporated by reference.

Figure 1:
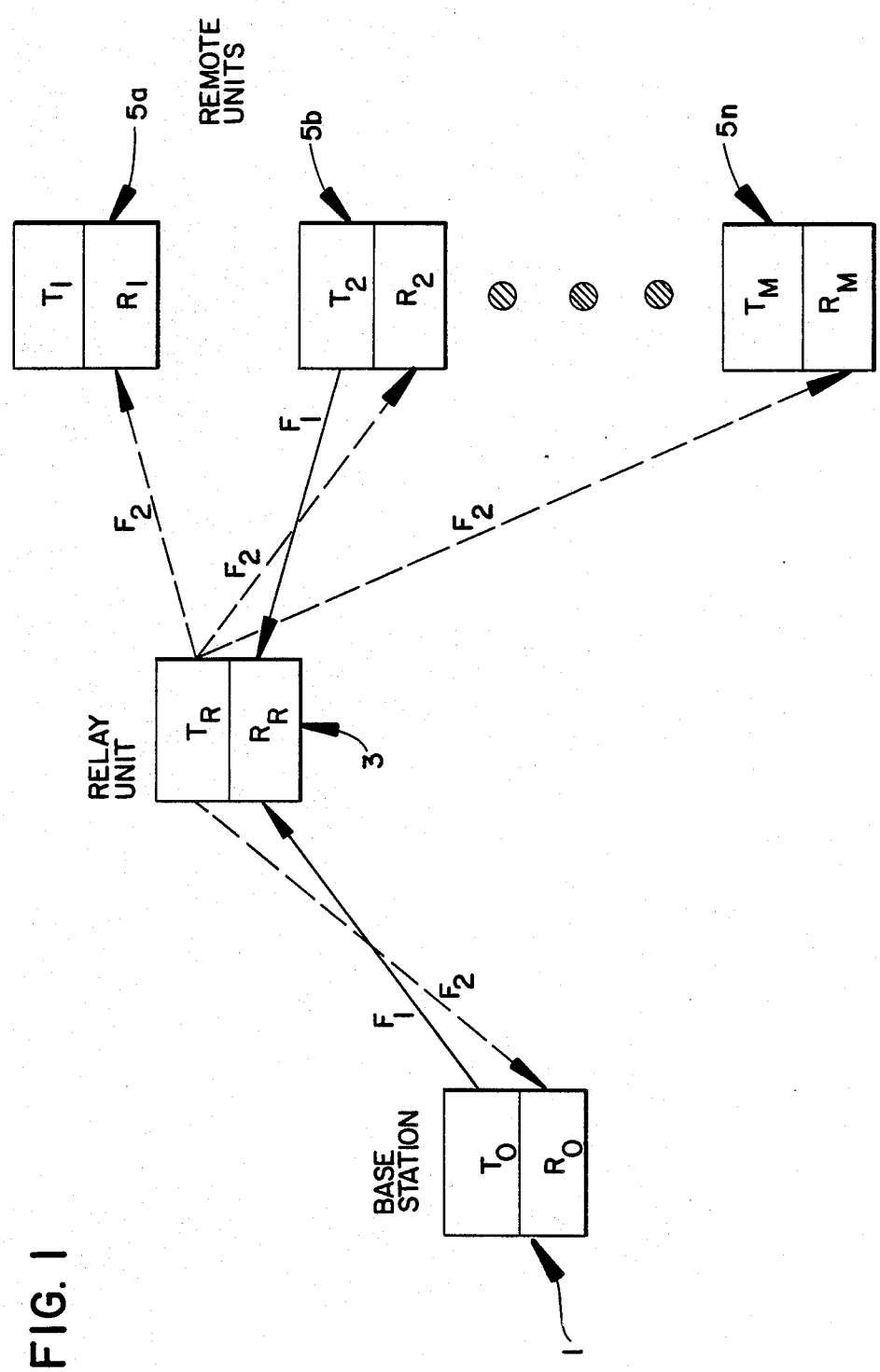
FIG. 1 is a block diagram of a data communication system arranged in accordance with a present invention.

As shown in FIG. 1, the present invention consists of a base station 1 comprised of a transmitter portion, $T_o$, and a receiver portion, $R_o$, constructed as shown in FIG. 1 of the aforementioned copending application Ser. No. 625,885.

Transmitter $T_o$ transmits an information signal on a so-called "up-link" frequency $F_1$ to a relay unit 3 and receiver $R_o$ receives a signal from relay unit 3 via "down-link" frequency $F_2$.

Relay unit 3 comprises a similar transmitter portion $T_r$ and receiver portion $R_r$ for transmitting and receiving signals at frequencies $F_2$ and $F_1$, respectively.

Also shown in FIG. 1 are one or more remote units $5_a$, $5_b$ ... $5_n$ which also include transmitter and receiver portions $T_a$, $R_a$, $T_b$, $R_b$, ... $T_n$, $R_n$, respectively, similar to those of base station 1 and relay unit 3. Receivers $R_a$, $R_b$, ... $R_n$ receive signals from relay unit 3 at frequency $F_2$ and transmitters $T_a$, $T_b$ ... $T_n$ optionally transmit a further information signal back to relay unit 3 via frequency $F_1$.

It is to be noted that transmission of signals from relay unit 3 to both remote units $5_a$, $5_b$ ... $5_n$ and base station 1 takes place at frequency $F_2$ while reception of signals from remote units $5_a$, $5_b$ ... $5_n$ and base station 1 by relay unit 3 takes place at frequency $F_1$.

Figure 2:
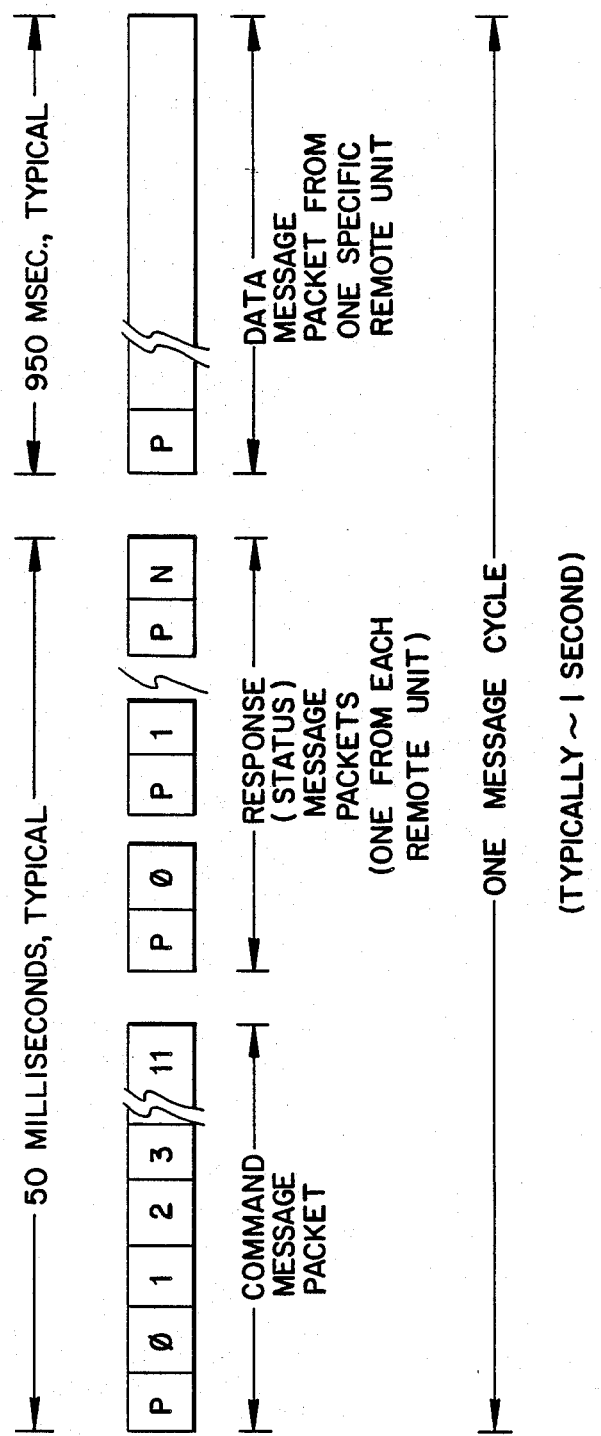
FIG. 2 shows diagramatically a typical information signal as used in the present invention.

In accordance with the present invention, frequencies $F_1$ and $F_2$ are periodically and randomly changed in order to prevent an eavesdropper from receiving the transmitted information signals and to prevent possible jamming. To this end, as shown in FIG. 2, the information signal transmitted by base station 1 to relay unit 3 and for subsequent retransmission to remote units $5_a$, $5_b$ ... $5_n$ contains a portion indicative of the next set of frequencies, $F_1$ and $F_2$, which will be used by the system for transmission and reception. This frequency indicative portion may be a signal representative of the next pair of transmission and reception frequencies, which signal may be further encrypted, as set forth in copending application Ser. No. 625,885. Alternatively, the frequency indicative portion may include information for setting the status of pseudo-random number (PN) generators associated with the frequency selecting circuits included as part of the base station, relay unit and each of the remote units, as discussed more fully below. This frequency indicative portion may also be encrypted.

Since each of the remote units transmits its information signal back to relay unit 3 via frequency $F_1$, it is necessary that each such remote unit be told to transmit only during predetermined time periods, so as to not interfere with each other. Accordingly, the information signal transmitted by base station 1 includes an address portion unique for each remote unit and a portion indicative of the time period in which each remote unit is to respond to any message from the base station relayed by relay unit 3. More particularly, aa shown in FIG. 2, the information signal transmitted by base station 1 includes a portion indicative of a unique time delay for each remote unit which specifies the amount of time the designated remote unit is to wait before responding to the base station and/or transmitting an information signal back to the base station.

In operation, an initial information signal is transmitted by base station 1 via frequency $F_1$ to relay unit 3 which retransmits the signal to remote units $5_a$, $5_b$ ... $5_n$ at frequency $F_2$. The relay unit and remote units have been initialized to receive the information signal at frequencies $F_1$ and $F_2$, respectively, in a manner as set forth in copending application Ser. No. 625,885. The portion of the information signal indicative of the next pair of different transmission frequencies $F_1$ and $F_2$ is decoded by the relay unit and remote units in preparation for the next information signal to be broadcast by the base station.

Upon reception of the information signal, each remote unit decodes the address portion of the signal and its associated time delay unique to each remote unit. Each remote unit may include a stable time reference or external time reference source (described below) for this purpose. Each remote unit waits until its specified time delay has elapsed and then transmits its information signal back to the base station via the relay unit, as described earlier. Upon reception of all information signals from the remote units by the base station, or after a predetermined maximum time delay (in the event one or more of the remote units is unable to communicate), the base station transmits a new information signal at new frequencies $F_1$ and $F_2$ (as set during the previous transmission cycle). This process of transmission from the base station to the remote units and back again via the relay unit may continue for as long as necessary with the frequencies of transmission, $F_1$, and $F_2$, being changed periodically and randomly so as to prevent eavesdropping or jamming.

Figure 3:
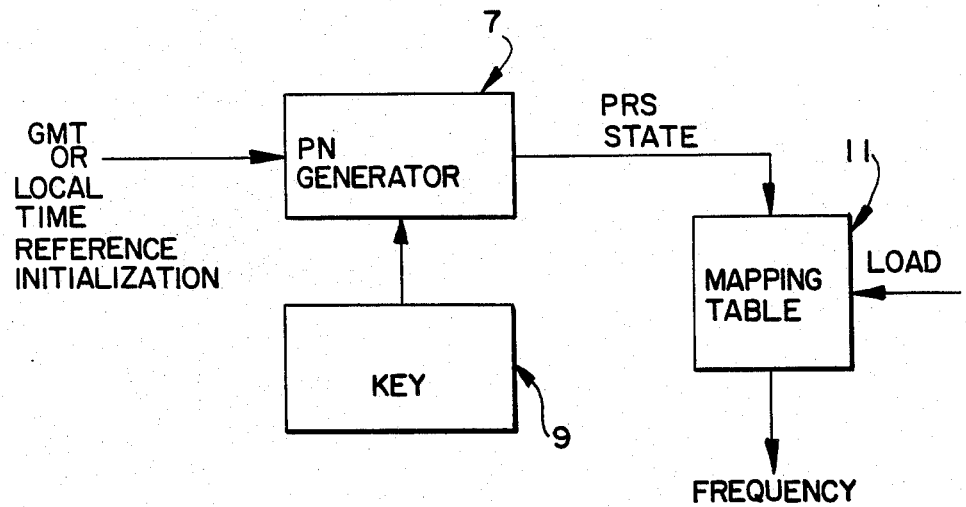
FIG. 3 is a block diagram of a first embodiment of a frequency selector circuit for use in the present invention.

As mentioned earlier, the relay unit and remote unit may have their frequency selecting circuits retuned for the next frequencies of transmission as set forth in copending application Ser. No. 625,885. Alternatively, these frequency selecting circuits may be set using internal frequency selecting apparatus whose state is initially set by a portion of the information signal transmitted by base station 1. More particularly, as shown in FIG. 3, the frequency selecting circuit includes a PN generator 7 whose initial state (e.g. the starting point in the PN code sequence) is responsive to a signal generated by key generator 9 and a stable time reference (e.g. a stable internal clock or a receiver tuned to receive a radio broadcasted time reference). The output of PN generator 7 is applied to a mapping table 11 (e.g. a random access memory) which contains information representative of specific transmission and reception frequencies. Thus, the state of PN generator 7, as initialized by key generator 9 and the stable time reference, will cause mapping table 11 to generate different frequencies $F_1$ and $F_2$ for each transmission cycle. To an eavesdropper, these frequencies will appear to periodically and randomly change or "hop".

Figure 4:
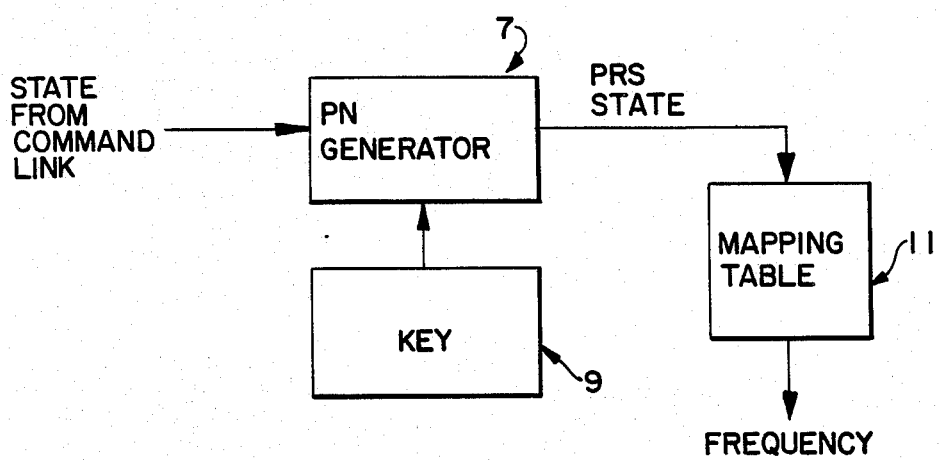
FIG. 4 is a block diagram of a second embodiment of a frequency selector circuit for use in the present invention.

As shown in FIG. 4, instead of using a stable time reference, the PN generator may be made responsive to a portion of the information signal transmitted by the base station.

The frequency mapping table, block 11, in FIGS. 3 and 4 may also be made responsive to a portion of the information signal transmitted by the base station. The sequence of the first and second frequencies can be controlled by either controlling the PN generator state, by altering the frequency mapping table contents, or by any combination of these two techniques. Thus the sequence or pattern of frequencies can be programmed initially, or changed dynamically by the transmitted information signal, to avoid certain frequency bands.

In either of the arrangements shown in FIGS. 3 or 4, the base station, relay unit, or remote units may include apparatus for detecting frequencies upon which jamming or interfering signals are present. This information can then be used to avoid these frequencies which might otherwise be selected by the mapping table.

Advantageously, the foregoing arrangement enables multiple remote units to communicate with a base station via a relay unit using frequency hopping and time-division multiplexing principles to minimize interference and the effects of possible jamming. Since the up-link and down-link frequencies are periodically and randomly changed it would be extremely difficult for an eavesdropper or jammer to discover any pattern to the frequency changes. Further, reception of one of the transmitted signals tells nothing about the frequency of transmission of the other signal. Therefore a jammer would at best be able to jam only half of the communications flow (i.e. the information being transmitted at the jamming frequency) and then only until the next transmission cycle when the frequencies would be changed again. Even in this latter case, the communication system is designed to detect such jamming frequencies and take corrective action to avoid such frequencies, such as by dynamically altering the state of the frequency mapping table or PN generator in response to a portion of the information signal.

While the present invention has been described in considerable detail, it is understood that various changes and modifications will fall within the scope of the invention. For example, multiple relays, each assigned to a group of remote units, could be used, with each relay being assigned a different set of uplink-/downlink frequencies by the base station. Alternatively, a relay unit could communicate with one or more additional relay units to extend the range of communication of the system. In this case one or more additional frequencies can be assigned for the intermediate (relay-to-relay) link. It should therefore be understood that the foregoing detailed description of the preferred embodiments is merely illustrative, but not limitive, of the invention which is defined by the appended claims.

We claim:

1. In a secure communication system of the frequency-hopping type generating successive signals at different frequency "hops" having at least one base station including a transmitter, at least one relay unit including a transmitter and a receiver, and at least one remote unit including a receiver, a method of preventing intentional jamming of the system comprising the steps of:
    (a) generating and transmitting at the base station an information signal at a first predetermined frequency;
    (b) receiving the information signal at the relay unit;
    (c) retransmitting the information signal by the relay unit at a second predetermined frequency; and
    (d) receiving the information signal at the remote unit,
    wherein information for setting both the first and second predetermined frequencies of the next hop is transmitted as part of the information signal and said predetermined first and second frequencies are periodically changed in accordance with a random pattern.

2. The method of claim 1 wherein the base station includes a receiver and the remote unit includes a transmitter, further including the steps of:
    (e) generating a second information signal at the remote unit;
    (f) transmitting the second information signal at the first predetermined frequency;
    (g) receiving the second information signal at the relay unit;
    (h) retransmitting the second information signal by the relay unit at the second predetermined frequency; and
    (i) receiving the second information signal at the base station.

3. The method of claim 1 wherein the information signal includes a portion representative of the first and second frequencies of transmission of the next information signal and wherein the relay unit retransmits the information signal at said second frequency which is determined by the frequency representative portion of an immediately preceding transmitted information signal.

4. The method of claim 2 wherein a first information signal transmitted by the base station includes a portion representative of the first and second frequencies of transmission of the next first and second information signals, and wherein the relay unit receives said first and second information signals at said first frequency and retransmits both the first and second information signals at said second frequency, said first and second frequencies being determined by the frequency representative portion of an immediately preceding information signal transmitted by the base station.

5. The method of claim 2 wherein, in step (h), the second information signal is transmitted by said remote unit at a predetermined time after the relay unit retransmits a first information signal transmitted by the base station.

6. The method of claim 5 wherein there are a plurality of remote units and wherein said information signal includes a portion indicative of separate and unique time delays for transmission of information signals generated by each of said remote units.

7. The method of claim 3 wherein the portion of the information signal representative of the first and second frequencies of transmission is an encrypted version of said first and second frequencies.

8. The method of claim 3 wherein the portion of the information signal representative of the first and second frequencies of transmission is a signal for changing the state of a pseudo-random frequency selector forming part of the transmitters and receivers of said relay unit and said remote unit.

9. The method of claim 3 wherein the portion of the information signal representative of the first and second frequencies of transmission is a signal for changing the state of a frequency mapping table containing data indicative of a plurality of predetermined frequencies, said frequency mapping table forming part of the transmitters and receivers of said relay unit and said remote unit.

10. A secure communication system of the frequency-hopping type generating successive signals at different frequency "hops", comprising:
    at least one base station including a transmitter;

at least one relay unit including a transmitter and a receiver; and at least one remote unit including a receiver, said base station transmitter including means for generating and transmitting an information signal at a first predetermined frequency;

said relay unit transmitter and receiver including means for receiving the information signal and for retransmitting the information signal at a second predetermined frequency and said remote unit receiver including means for receiving the information signal, wherein information for setting both the first and second predetermined frequencies of the next hop is transmitted by the base station as part of the information signal, said base station further including means for periodically changing said predetermined first and second frequencies in a random pattern and for transmitting information representative thereof to the relay unit and remote unit.

11. The system of claim 10 further including:

means for generating a second information signal at the remote unit;

means located at the remote unit for transmitting the second information signal at the first predetermined frequency, the second information signal being received by the receiver of the relay unit and retransmitted by the transmitter of the relay unit at the second predetermined frequency; and receiver means located at the base station for receiving the second information signal.

12. The system of claim 10 wherein the information signal generated by the base station includes a portion representative of the first and second frequencies of transmission of the next information signal and wherein the relay unit retransmitting means retransmits the information signal at said second frequency which is determined by the frequency representative portion of an immediately preceding transmitted information signal.

13. The system of claim 11 wherein the base station generating and transmitting means generates and transmits a first information signal at said first frequency including a portion representative of the first and second frequencies of transmission of the next first and second information signals, and wherein the remote unit receives said first and second information signals at said first frequency and the relay unit retransmitting means retransmits both the first and second information signals at said second frequency, said first and second frequencies being determined by the frequency representative portion of an immediately preceding information signal transmitted by the base station.

14. The system of claim 11 wherein there are a plurality of remote units and wherein said first information signal includes a portion indicative of separate and unique time delays for transmission of information signals generated by each of said remote units.

15. The system of claim 12 wherein the base station includes means for encrypting the portion of the information signal representative of the first and second frequencies of transmission.

16. The system of claim 12 wherein the portion of the information signal representative of the first and second frequencies of transmission is a signal for changing the state of a pseudo-random frequency selector forming part of the transmitters and receivers of said relay unit and said remote unit.

17. The system of claim 12 wherein the portion of the information signal representative of the first and second frequencies of transmission is a signal for changing the state of a frequency mapping table containing data indicative of a plurality of predetermined frequencies, said frequency mapping table forming part of the transmitters and receivers of said relay unit and said remote unit.

18. The method of claim 10 wherein any of said base station, relay unit, or remote unit includes means for randomly changing said first and second predetermined frequencies.

* * * * *